Aug. 27, 1935.   E. T. OLSON   2,012,477
PRODUCTION OF GASES FOR SYNTHESIS
Filed Aug. 30, 1933
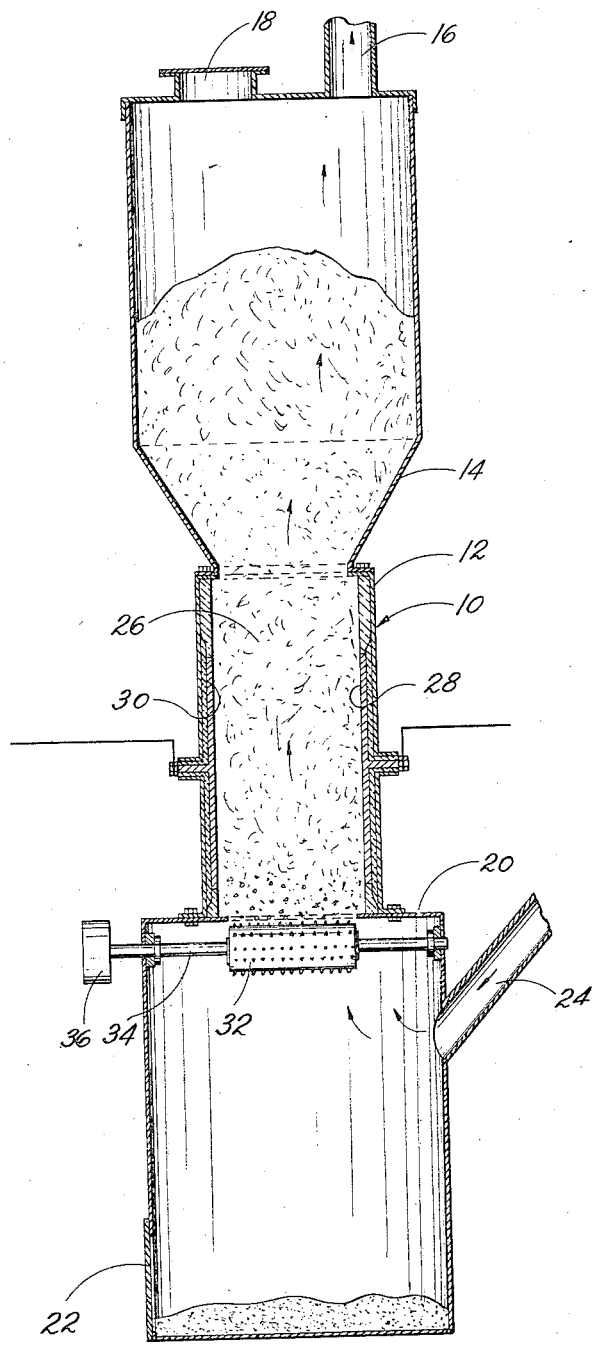
Inventor
EDGAR T. OLSON
By Richey & Watts
Attorneys Patented Aug. 27, 1935

2,012,477

UNITED STATES PATENT OFFICE 2,012,477

PRODUCTION OF GASES FOR SYNTHESIS

Edgar T. Olson, New York, N. Y., assignor to The Cleveland Cliffs Iron Company, Cleveland, Ohio, a corporation of Ohio Application August 30, 1933, Serial No. 687,511

5 Claims. (Cl. 23—5)

This invention relates to the production and use of gases such as involved in industrial chemical reactions and more particularly is concerned with the manufacture and use of carbon monoxide gas.

Heretofore in the manufacture of coke and charcoal by the destructive distillation of wood and other carbon, gases have been produced having a carbon monoxide content. However, these gases, neither with nor without treatment, are ordinarily free from objectionable catalyst effecting substances and impurities and are either waste products or are used as cheap fuels and in other inexpensive relations such as the reduction of ores.

Prior to the present invention no one has, so far as I am informed, conceived the idea of producing by a novel method, and as a by-product in the destructive distillation of selected carbons, gas having a high carbon monoxide content and being substantially free of impurities and catalyst effecting substances and then using the gas in commercial chemical reactions ordinarily calling for carbon monoxide gas substantially pure chemically. For example there are no prior commercial methods, known to me, of producing from wood oven gas, gases containing high percentages of carbon monoxide with the gases being free from objectionable impurities.

The gases previously produced commercially, such as wood oven gases, containing the largest amounts of carbon monoxide were not sufficiently free from the gaseous impurities, such as carbon dioxide, methane, oxygen, nitrogen, sulphur or its oxides and/or hydrogen, to be well suited for use in the manufacture of chemicals and for similar high grade use and, moreover, they did not contain carbon monoxide in high enough percentages to make the use thereof particularly efficient for such purposes. For example, in the past one source of carbon monoxide gas has been what is commonly known as "producer gas" which is obtained by the distillation of coal, but this gas contains carbon monoxide to the extent of under 40% and, furthermore, is more or less contaminated with the above mentioned gaseous impurities and sometimes with other impurities which militate against the above mentioned use for such gases.

According to the present invention, gases are produced which have carbon monoxide contents ranging from possibly 45% as a minimum up to as high as 95% in many instances and with gaseous impurities such as those mentioned above, in amounts insufficient to interfere to a marked or serious extent with the subsequent use of the gas for such high grade uses as in the manufacture of chemicals and other products. While gases from various sources may be treated according to the present invention and are thus to be considered as comprehended within the scope of the present disclosure, I have found that wood and "wood oven" gas are particularly adapted to treatment by the present invention. "Wood oven" gas is the gas resulting from the destructive distillation of wood in ovens in the manufacture of charcoal. It has been generally used heretofore only as fuel and is frequently allowed to escape into the air. By the teaching of the present invention this inexpensive and in many instances waste product is treated and refined by a commercially practical method to produce a gas which is substantially carbon monoxide and which can be employed in industrial chemical processes as carbon monoxide.

Typical chemical manufacturing methods employing carbon monoxide gas as a constituent include for example that described in United States Patent No. 1,935,914, issued on Nov. 21, 1933, and entitled "Preparation of aldehydes". By the process described in the referred to copending application, benzene is subjected to the action of carbon monoxide in the presence of a catalyst such as aluminum chloride to produce benzaldehyde. In the commercial application of this method large quantities of carbon monoxide are required with the gas being substantially free of impurities such as nitrogen, sulphur, oxygen, and various other substances which tend to effect the carbon monoxide content or the catalyst.

In Patent No. 1,994,433 there is disclosed a commercial method of producing propionic acid wherein carbon monoxide is employed in considerable amounts. This reaction involves the formation of ethyl propionate in gas phase by passing a mixture of carbon monoxide and ethyl alcohol over a catalyst.

By another process I have caused carbon monoxide to react with ethyl ether in the presence of a catalyst to form propionic anhydride.

Another method I have devised consists of the addition of carbon monoxide to ethyl chloride to form propionyl chloride with a subsequent hydrolysis to propionic acid.

I have also caused carbon monoxide to react with ethylamine to form propionamide which is hydrolized to produce propionic acid.

I have also made formanide by causing carbon monoxide to react with ammonia and thereafter causing the formanide to react with ethyl alcohol to produce propionamide.

The foregoing chemical reactions are indicative of those in which carbon monoxide is employed industrially and in which in the past chemically pure carbon monoxide was utilized which was expensive to produce thereby adding materially to the cost of the processes and resulting products. The present invention avoids and overcomes the difficulties of the prior art practices by the provision of an inexpensive carbon monoxide gas suitable for chemical use, which gas is made as a by-product in a novel process now to be described.

The single sheet of drawing illustrates one form of apparatus for producing the improved gas of the present invention.

As stated above, the invention is particularly adapted to treat wood and "wood oven" gas and accordingly this phase of the invention will be taken as typical and will be described. The wood to be distilled and reduced to charcoal is placed in a usual distilling furnace and heated in any suitable manner and in the complete absence of air and other carbons or liquids to temperatures ordinarily ranging up to 1000° C. whereby the distillation of the volatile gases therein is initiated. An important feature of the invention is that during this initial heating, which may be at reduced temperatures, the volatile matter distilled off is allowed to escape to the atmosphere or is placed in a separate container. Thus all air from the furnace, considerable air and moisture from the wood and certain high volatiles from the wood are removed. Thereafter the distillation is completed with the unadulterated gases being passed to the reducing apparatus. Before the gases are reduced a typical composition is up to 10% methane, up to 5% hydrogen, up to 30% carbon monoxide, bare traces of nitrogen and/or sulphur and the remaining portion being carbon dioxide.

The reducing apparatus may take a plurality of forms. However, that illustrated in the drawing has been found very satisfactory in that particularly rapid and complete reductions of treated gas have been accomplished. In the drawing the numeral 10 indicates generally an electric furnace comprising a heat insulated body 12 to which may be secured a hopper-like top 14 having a conduit 16 secured thereto and a removable cover 18. The electric furnace may be mounted upon an ash receiving base 20 having an ash door 22 and a gas conduit 24.

The numeral 26 indicates the carbon utilized in the furnace which carbon is preferably in the form of granular charcoal. The carbon is heated to incandescence through the agency of suitable electrodes 28 and 30 which are connected to a proper source of current.

In order to remove the ash from the bottom of the electric furnace body 12 some suitable grate means may be provided such as the rotatable drum 32 which can be rotated or oscillated through the agency of shaft 34 and pulley or lever 36.

In the operation of the apparatus just described the gas to be reduced is passed into the furnace by way of conduit 24 thence up through the furnace and out of conduit 16 as indicated by the arrows. The gas initially passed thru the furnace may be discarded if it is found that the air trapped in the furnace when the reduction action is initiated causes impurities in the reduced gas. The carbon 26 employed in the reaction is placed in the hopper 14 through the door 18 before the treating operation, with periodic renewals when necessary, taking care that no air or other foreign materials are permitted to enter into the electric furnace. The electrodes 28 and 30 are subjected to the proper amount of electric current to heat the charcoal 26 by inherent resistance to incandescence, and when the gas is passed thru the heated charcoal the chemical reduction of the gas is effected. This ordinarily comprises reducing the carbon dioxide to carbon monoxide in accordance with the formula $CO_2+C=2CO$. The following reaction may also be involved $H_2O+C=H_2+CO$. The rotatable grate 32 is operated periodically or possibly continuously to remove the ashes formed at the bottom of the electric furnace and to drop them down into the bottom of the ash pit 20 from whence they can be removed through door 22.

In employing the apparatus just described the furnace temperature is maintained preferably in excess of about 1550° by the current passed thru the carbon in the furnace. The flow of current is preferably such that arcing occurs between the pieces of carbon and such arcing tends, we believe, to expedite the conversion of the carbon dioxide into carbon monoxide and to decrease the amount of gaseous impurities. With such apparatus we have treated "wood oven" gas of the composition above set forth and have obtained a gas consisting of about 75% carbon monoxide, about 1% methane, about 1% carbon dioxide, bare traces of N and S, and the balance mainly hydrogen. By somewhat increasing the temperature of the furnace and decreasing the rate of gas flow therethru increased efficiency has been obtained and the resulting new gas may contain as much as about 95% carbon monoxide. By decreasing the temperature and/or increasing the rate of gas flow resulting gases of varying compositions may be obtained over the wide range of from about 45% to about 95% of carbon monoxide, up to about 4% methane, up to about 12% of carbon dioxide, bare traces of N and S, with the balance mainly hydrogen. As illustrative of gases of different compositions which may be so produced, I mention the following compositions—

1. From about 60% to 95% carbon monoxide, up to about 4% methane, up to about 12% carbon dioxide and the balance mainly hydrogen.

2. From about 65% to about 80% carbon monoxide, up to about 4% methane, up to about 12% carbon dioxide, the balance mainly hydrogen.

Many other compositions of gases within the limits of the constituents set forth herein may be made, but for the purpose of disclosure the foregoing examples will serve as illustrations of all such variations.

From the foregoing it will be evident that by the present invention a gas has been made as a by-product in the distillation of wood which gas is substantially carbon monoxide and which is free of chemical impurities and catalyst affecting substances. This gas is accordingly employed in industrial chemical manufacturing processes involving the use heretofore of chemically pure carbon monoxide. Thus it has been found that our improved and carefully treated wood oven gas can be used in the commercial production of aldehydes and propionic acid and other substances which heretofore used expensive pure carbon monoxide.

It will be appreciated that other carbons than wood can be used as starting materials where these starting materials either do not contain the undesirable impurities or where the initial distilling operation will drive off the same and leave only the desired constituents in the final gas.

Having thus described the present invention so that those skilled in the art may be able to practice the same, what I desire to secure by Letters Patent is described in what is claimed.

What I claim is:

1. A method of making a gas suitable for use in the production of chemicals which includes the steps of heating wood in the absence of air, other carbons and fluids, discarding the first run of gas containing substantially all the air, moisture, volatiles and oils from resins, originally contained in the wood, continuing the heating and collecting the substantially pure wood oven gas resulting from such continued heating, and reducing carbon dioxide contained in such collected gas to carbon monoxide.

2. The method of making a gas suitable for use in the production of chemicals which includes the steps of heating wood in the absence of air, other carbons and fluids, discarding the first run of gas containing substantially all the air, moisture, volatiles and oils from resins, originally contained in the wood, continuing the heating and collecting the resulting substantially pure wood oven gas, and converting said collected gas into a gas consisting predominantly of carbon monoxide and containing small amounts of hydrogen, methane and carbon dioxide by passing such gas thru highly heated charcoal in substantial absence of air.

3. The method of making a gas suitable for use in the production of chemicals which includes the steps of initially heating wood in a closed chamber until the air and moisture in the chamber and in the wood, and high volatiles have been expelled, continuing the heating in a manner to distill the wood and collecting the resulting substantially pure wood oven gases containing up to about 10% methane, up to about 5% hydrogen, up to about 30% carbon monoxide, with substantially all the remainder being carbon dioxide, and decreasing the amount of carbon dioxide in the gases by passing such gases in substantial absense of air thru highly heated charcoal.

4. The method of making gas suitable for use in the production of chemicals which includes the steps of heating wood in a confining chamber and discarding the air, water vapor and high volatiles resulting from the initial part of such heating, continuing the heating and collecting substantially pure wood oven gases containing up to about 10% methane, up to about 5% hydrogen, up to about 30% of carbon monoxide, bare traces of nitrogen and sulphur, the remainder being substantially carbon dioxide, and treating such collected gas in substantial absence of air to reduce the carbon dioxide content to below about 12% and correspondingly increase the carbon monoxide content.

5. The method of manufacturing a gas suitable for use in the presence of catalysts in the production of chemicals and containing between about 45% and about 95% of carbon monoxide, up to about 4% methane, up to about 12% carbon dioxide, being free from amounts of nitrogen air and sulphur harmful to catalysts, and the remainder being principally hydrogen, said method comprising the steps of heating wood in the absence of air, other carbons and fluids, discarding the first run of gas containing substantially all the air, moisture, volatiles and oils from resins, originally contained in the wood, continuing the heating and collecting the subtantially pure wood oven gas resulting from such continued heating, passing such collected wood oven gas thru an enclosed bed of lump or granular charcoal heated in excess of about 1550° C., in substantial absence of air while sufficient electric current is flowing thru said bed to maintain the temperature of the latter substantially constant and to cause arcing between the lumps and granules.

EDGAR T. OLSON.